United States Patent [19]

Citterio

[11] Patent Number: 4,491,599
[45] Date of Patent: Jan. 1, 1985

[54] COMPOUND ANIMAL FEED SUITABLE FOR LONG-TERM PRESERVATION AND PROCESS FOR ITS PREPARATION

[75] Inventor: Enrico Citterio, Milan, Italy

[73] Assignee: Maistore S.p.A., Bergamo, Italy

[21] Appl. No.: 404,961

[22] Filed: Aug. 3, 1982

Related U.S. Application Data

[63] Continuation-in-part of Ser. No. 197,361, Oct. 15, 1980, abandoned.

[30] Foreign Application Priority Data

Oct. 18, 1979 [IT] Italy ............................. 26607 A/79

[51] Int. Cl.³ ............................................. A23K 3/00
[52] U.S. Cl. .................................. 426/331; 426/623; 426/658; 426/807
[58] Field of Search ............... 426/623, 635, 658, 807, 426/309, 310, 307, 303, 331, 626, 630

[56] References Cited

U.S. PATENT DOCUMENTS

| | | | |
|---|---|---|---|
| 3,246,989 | 4/1966 | Biehl | 426/623 |
| 3,930,031 | 12/1975 | Kealy | 426/307 |
| 4,053,645 | 10/1977 | Jelks | 426/635 |
| 4,212,896 | 7/1980 | Brown et al. | 426/658 |

FOREIGN PATENT DOCUMENTS 1431771 4/1976 United Kingdom ............... 426/310

*Primary Examiner*—George Yeung
*Attorney, Agent, or Firm*—Stevens, Davis, Miller & Mosher

[57] ABSTRACT

A compound animal feed suitable for long-term preservation is disclosed. The feed is constituted by a mixture including a product chosen from wet cereals such as wet maize grain, maize grain meal or mash, maize cob meal or mash or their mixtures, which product is ground to a degree of fineness suitable for direct feeding to animals; molasses suitable for use in animal husbandry; and oil or fat suitable for use in animal husbandry, the feed mixture having a pH value less than 4.

Preferably this pH value is obtained by treatment of the fine ground product with phosphoric acid.

Also disclosed is a process for the long-term preservation of wet cereals by treatment thereof with phosphoric acid or other suitable acids until a pH less than 4 is reached, and then combining the treated cereals with molasses and oil or fat.

7 Claims, No Drawings

COMPOUND ANIMAL FEED SUITABLE FOR LONG-TERM PRESERVATION AND PROCESS FOR ITS PREPARATION

This is a continuation-in-part application of application Ser. No. 197,361, filed Oct. 15, 1980 and now abandoned.

The present invention relates to a compound animal feed suitable for long-term preservation, based essentially on cereals, such as maize, barley, sorghum and the like. More particularly, the present invention relates to a feed obtained from wet grain, grain meal or mash, or a meal or mash formed from the entire grain heads of said cereals, and from their mixtures.

The invention also relates to a process for long-term preservation of cereals, while obtaining a compound animal feed.

In the following description and subsequent claims, by the definition "grain meal or mash" it is intended to specify a product obtained by grinding or crushing wet cereal grains, such as maize, barley, sorghum and the like containing 30–40% of moisture, while by the definition "grain-head meal or mash" it is intended to specify a product obtained by grinding the entire head, or ear, of the cereal which, in the case of maize, includes the grains and the core of the maize cob, also in wet condition.

It is known that cereal supplies for animal feeds and, in particular, maize for animal feeds, may in fact consist of dry grain, wet grain or a meal or mash formed from the grain or grain heads. It is equally well known that, for a whole series of recognized advantages, feed supplies constituted by wet cereals in the form of wet grain, or grain or cob mash or meal, having a 30–40% moisture content, have been of particular interest to, and favoured by, cultivators and breeders for some time. However, with this type of feed supply, there are problems relating to the preservation of the wet cereal, the resolution of these problems being of considerable importance to the entire economy of the breeding industry. Indeed, for stockage, or storage of the moist cereal in silos, the cereal is pre-ground to a degree of fineness whereby the average particle size is 1-2 mm, the cereal has a considerable moisture content (30% to 40%) and, when placed in heaps, has a large apparent volume due to the high content of air present between the particles. Bacteria and moulds develop rapidly in this wet cereal, while the complex and well known phenomenon of fermentation initiates equally rapidly and, from an initial acetic fermentation, passing through a lactic fermentation, may proceed to a butyric fermentation with vigorous proteolytic effect. The most evident and immediate consequence of these phenomena (fermentation and mould formation) is the considerable loss of food value.

The methods proposed and used up till now for overcoming these disadvantages consist of appropriate storage in silos; or the addition of chemical preservatives, particularly organic acids such as propionic and acetic acids to the wet, ground cereals; or a mixed method comprising storage in silos together with the addition of chemical preservatives.

With regard to the silo-storage method, a satisfactory outcome to the preservation of the wet, ground cereals depends on the moisture content of the cereal, the care and speed with which the silo is filled and the cereal pressed, and limiting the quantity of air remaining in the cereal stored in the silo.

Consequently the silo must be such as to ensure that the aforesaid operations can be carried out extremely well, and, above all, must ensure a hermetic seal to prevent any contact between the cereal in the silo and the surrounding air. Moreover, homolactic fermentation must be induced in the stored product in the shortest possible time and must be suitably controlled, for example by seeding with a considerable quantity of lactic initiators, so as effectively to prevent the initiation of a subsequent butyric fermentation. In order to carry out this method of preservation it is therefore necessary to use a silo having appropriate structural and functional characteristics, fitted out with relatively complex devices and equipment for controlling the desired fermentation phenomenon. In addition to the high cost of buying such a silo, its use involves the further considerable costs of installation, operation and maintenance. All of these costs are further aggravated by the fact that the quantity of wet, ground cereal which must be stored to provide the annual feed of an average-sized animal breeding farm requires the installation of several silos of the said type.

The addition of chemical preservatives, which are almost wholly limited to organic acids and particularly propionic acid, is known to be expensive, and also has disadvantages due to the volatility of the preservatives. This limits the persistence of the preservatives in the mass of wet, treated cereal and causes appreciable irritation to the eyes, mucous membranes and respiratory tracts of workers during handling of the wet, treated cereal.

The mixed method has the same disadvantages set out above with respect to the two methods considered, although to a lesser degree. A principal object of the present invention is the provision of a compound animal feed made from wet ground cereals, particularly from wet, ground maize (wet grains, grain or grain head meal or mash), the preservation of which is ensured for a prolonged period of time, at least of the order of the period between two successive harvests of the cereal, by overcoming all the technical and economic disadvantages set out above with reference to the prior art methods of storing just harvested cereals, without any drying or cooking thereof.

According to the present invention the problems seen in the prior art can be solved by providing a compound animal feed suitable for long-term preservation, characterized in that it is constituted by a mixture including wet cereals ground to a degree of fineness suitable for direct feeding to animals, molasses for use in animal husbandry and fat or oil for use in animal husbandry, and has a pH less than 4.

Somewhat differently stated, the prior art problems are resolved, according to the present invention, by a process which allows long-term preservation of wet cereals by treatment thereof with $H_3PO_4$, and possibly other suitable acids, until a pH less than 4 of the mass is reached and then by compounding the cereals with a sufficient amount of fat to completely exclude contact of the cereals with air and with a sufficient amount of molasses to confer compactness to the feed and to further protect the grains from air.

According to a characteristic of the invention, the prepared mixture has a pH value of between 2 and 3 due to the presence therein of phosphoric acid, and includes from 10% to 15% of fat or oil suitable for use in animal husbandry, and from 8% to 18% of molasses or its derivatives usable for animal fodder, given in percentages by weight of the weight of the wet, ground cereal. In order to make a compound animal feed according to the present invention, initially the wet cereal is ground, that is to say, the wet grain/grain meal or mash/grain-head meal or mash, or their mixtures are ground. The degree of fineness of the ground product is that held, at the time, to be suitable for direct feeding to animals.

The ground product thus obtained (fine ground product) is subsequently mixed with an aqueous solution of a chosen acid, in a quantity such as to confer a pH of less than 4, and preferably from 2 to 3, on the ground product. In fact at these values of the pH, no fermentation whatsoever and no formation of mould in the ground product takes place. Naturally, the mixing must be carried out carefully and for a sufficiently long period of time to ensure that all the particles of the fine ground product are wetted by the acidic solution.

According to one aspect of the invention, of the acids usable for the said purpose, phosphoric acid is chosen in that it is a supplement for the animal feed. By this choice the advantages of providing a final mixture (compound animal feed) with the desired pH value and of incorporating the anticipated quantity of food supplement in the feed are achieved simultaneously. The quantity of phosphoric acid which must be used to achieve this double advantage is from 2% to 4% by weight based upon the weight of the fine ground cereal.

In order to facilitate the desired intimate contact of all the particles of the fine ground product with the phosphoric acid solution, the latter is used in an aqueous 75% solution. The quantity of phosphoric acid may be reduced when it is desired to supplement the animal feed with a bicalcium phosphate as is usual in the conventional method. In this case, however, the phosphoric acid would not guarantee the desired pH of the final product and it would be necessary to counterbalance the reduced quantity of phosphoric acid by adding a suitable quantity of another acid, preferably hydrochloric, formic, propionic, citric or fumaric, for example.

After treatment with the acid, the fine ground cereal product is intimately mixed with a suitable quantity of a molasses product usable in animal husbandry, preferably cane-sugar molasses and, before or subsequently, with a further suitable quantity of oil or fat, including hard fats such as tallow and suet, suitable for use in animal husbandry.

With this double mixing, the fine ground cereal product is concerted into a homogeneous mixture free from inclusions of air. As a result, this mixture is not susceptible to any aerobic fermentation, while anaerobic fermentations with formation of moulds are prevented by the preceding treatment with the acid.

Hence, the mixture constituting the animal feed of the present invention can safely be preserved between two successive harvests. In addition to this important characteristic, the mixture further includes additives which are well known for their usefulness for animal growth and for a balanced diet.

In order to achieve the above described basic results, it is found that the optimum quantities of molasses and fat or oil which should be added and mixed with the fine ground cereal product are 8% and 11% by weight, respectively, calculated on the weight of the chosen fine ground cereal product.

Although the fine ground product may be treated simultaneously with an acidic solution, phosphoric acid and/or some other acid, and with molasses, the treatment with the oil or fat is necessarily carried out after the treatment with the acid. This considerably reduces the possibility of the oil or fat preventing contact of the acid with the ground particles, by previously coating the individual particles, and thus allowing the subsequent initiation and completion of a fermentation process or the formation of mould.

It has been found however that the treatment with the acid and the fat or oil and with the molasses may be carried out, to advantage, directly on the meal or mash, before or simultaneously with the grinding.

The mixture obtained by the above-described method of preparation may be stored in any container, for example in vats or trenches, or may simply be piled in heaps and does not require any further handling or precautions for its preservation over a prolonged period of time.

A mixture prepared from maize mash in September by the method described above, a maize mash preserved in a conventional silo and a maize mash preserved in a trench were examined simultaneously month by month starting from the sixth month after their storage or stocking. No micotoxins were found in the mixture constituting the animal food of the present invention from the sixth to the twelfth month but such micotoxins were found to be present in the mashes stocked or stored in silos according to the known art. In particular, in the mashes of the known art, 0.07 and 0.17 mg of micotoxin/kg of mash were found after the sixth and tenth month respectively. The maximum value allowable is 0.02 mg/kg. Moreover, it was possible to establish that the process of hydrolysis of the proteins, in the product of the present invention, brings about an increase in the total quantity of soluble nitrogen of at least ten times less than the increase in this soluble quantity found in the product stored in silos according to the known art. Preferably the hydrolysis in the product of the invention is linked to the action of the phosphoric acid while, in the product stored in silos according to the known art, the hydrolysis is due to microbic degradation.

A further important result is constituted by the fact that, in the product of the present invention, no production of lactic acid occurred and a reduced production of acetic acid was found. In the product of the known art, traces of butyric acid were found in addition to notable quantities of the aforesaid acids.

I claim:

1. A compound animal feed having a resistance to deterioration that makes the feed suitable for long-term preservation, consisting essentially of uncooked, ground cereals having a naturally occurring moisture content of 30–40% by weight, said cereals being characterized by an absence of fermentation treatment; at least one acid present in an amount sufficient to provide the feed with a pH of less than 4; a fat or oil in an aount of 10–15% by weight based upon the weight of the wet cereals; and molasses in an amount of 8–18% by weight based upon the weight of the wet cereals.

2. The compound animal feed of claim 1, wherein the at least one acid consists essentially of phosphoric acid in an amount of 2–4% by weight based upon the weight of the wet cereals and the pH of the feed is in the range of 2 to 3.

3. The compound animal feed of claim 2, wherein a portion of the phosphoric acid is replaced by an acid selected from the group consisting of hydrochloric, formic, propionic, citric and fumaric acids.

4. A process for the long-term preservation of fresh, uncooked cereals having a naturally occurring moisture content of 30–40% by weight, comprising:
    wetting the cereals with an aqueous solution containing phosphoric acid in an amount of 2–4% by weight based upon the weight of the cereals; and
    mixing the acid-treated cereals with a fat or oil in an amount of 10–15% by weight based upon the weight of the cereals and molasses in an amount of 8–18% by weight based upon the weight of the cereals,
    said process being characterized by an absence of cooking or fermentation treatment of the cereals.

5. The process of claim 4, wherein an acid selected from the group consisting of hydrochloric, formic, propionic, citric and fumaric acids is substituted for a portion of the phosphoric acid in the aqueous solution.

6. A process for preparing a compound animal feed consisting essentially of uncooked, fresh cereals having a naturally of occurring moisture content of 30–40% by weight, said feed being characterized by a resistance to deterioration that makes the feed suitable for long-term preservation, comprising:
    wetting the cereals with an aqueous solution containing phosphoric acid in an amount of 2–4% by weight based upon the weight of the cereals; and
    mixing the acid-treated cereal with a fat or oil in an amount of 10–15% by weight based upon the weight of the cereals and molasses in an amount of 8–18% by weight based upon the weight of the cereals,
    said process being characterized by an absence of cooking or fermentation treatment of the cereals.

7. The process of claim 6, wherein an acid selected from the group consisting of hydrochloric, formic, propionic, citric and fumaric acids is substituted for a portion of the phosphoric acid in the aqueous solution.

* * * * *